(12) United States Patent
Nakamura et al.

(10) Patent No.: US 12,518,921 B2
(45) Date of Patent: Jan. 6, 2026

(54) CERAMIC ELECTRONIC DEVICE AND MANUFACTURING METHOD OF THE SAME

(71) Applicant: TAIYO YUDEN CO., LTD., Tokyo (JP)

(72) Inventors: Keigo Nakamura, Takasaki (JP); Michio Oshima, Takasaki (JP); Shunya Fukuda, Takasaki (JP); Jyouji Ariga, Takasaki (JP); Yoshinori Shibata, Takasaki (JP); Takashi Asai, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 188 days.

(21) Appl. No.: 18/170,389

(22) Filed: Feb. 16, 2023

(65) Prior Publication Data

US 2023/0290573 A1 Sep. 14, 2023

(30) Foreign Application Priority Data

Mar. 10, 2022 (JP) ................................ 2022-037360

(51) Int. Cl.
*H01G 4/12* (2006.01)
*H01G 4/232* (2006.01)
*H01G 4/30* (2006.01)

(52) U.S. Cl.
CPC ......... *H01G 4/1227* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2015/0318111 A1* | 11/2015 | Lee | H01G 4/2325 29/25.03 |
| 2017/0125167 A1* | 5/2017 | Kawakami | H01G 4/236 |
| 2020/0135403 A1* | 4/2020 | Lee | H01G 4/12 |
| 2021/0118615 A1 | 4/2021 | Shimura et al. | |
| 2022/0285096 A1* | 9/2022 | Iguchi | H01G 4/1227 |

FOREIGN PATENT DOCUMENTS

| | | | | |
|---|---|---|---|---|
| JP | H053134 A | | 1/1993 | |
| JP | 11016764 A | * | 1/1999 | ............ H01G 4/005 |
| JP | 2004123427 A | | 4/2004 | |
| JP | 2021068734 A | | 4/2021 | |

* cited by examiner

*Primary Examiner* — Eric W Thomas
(74) *Attorney, Agent, or Firm* — Law Office of Katsuhiro Arai (57) ABSTRACT

A ceramic electronic device includes a multilayer chip having a plurality of dielectric layers and a plurality of internal electrode layers so as to face each other, each of the plurality of internal electrode layers being stacked via each of the plurality of dielectric layers, an external electrode that is provided on an end face of the multilayer chip, contacts each end of at least a part of the plurality of internal electrode layers, and includes a co-material, the end face being an end of the multilayer chip in a direction in which the plurality of internal electrode layers extend, and a projection portion that is provided between the external electrode and the multilayer chip and has a projection shape toward the external electrode from the multilayer chip. A main component of the projection portion is ceramic including at least Ba, Ca and Ti.

16 Claims, 7 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-037360, filed on Mar. 10, 2022, the entire contents of which are incorporated herein by reference.

FIELD

A certain aspect of the present invention relates to a ceramic electronic device and a manufacturing method of the ceramic electronic device.

BACKGROUND

Conventionally, ceramic electronic components such as multilayer ceramic capacitors have been used in a wide range of fields due to their excellent characteristics such as small size, large capacity, semi-permanent life, and low resistance at high frequencies. In recent years, ceramic electronic components have been miniaturized and made into chips for the purpose of miniaturizing devices to be mounted or for the purpose of reducing the cost of the ceramic electronic components themselves.

SUMMARY OF THE INVENTION

According to an aspect of the present invention, there is provided a ceramic electronic device including: a multilayer chip having a plurality of dielectric layers and a plurality of internal electrode layers so as to face each other, each of the plurality of internal electrode layers being stacked via each of the plurality of dielectric layers; an external electrode that is provided on an end face of the multilayer chip, contacts each end of at least a part of the plurality of internal electrode layers, and includes a co-material, the end face being an end of the multilayer chip in a direction in which the plurality of internal electrode layers extend; and a projection portion that is provided between the external electrode and the multilayer chip and has a projection shape toward the external electrode from the multilayer chip in a cross section including a stacking direction of the plurality of dielectric layers, wherein a main component of the projection portion is ceramic including at least Ba, Ca and Ti.

According to another aspect of the present invention, there is provided a manufacturing method of a ceramic electronic device including: forming a dielectric green sheet of which a main component ceramic is ceramic powder including Ca and Zr; forming an internal electrode pattern of a conductive paste, on the dielectric green sheet; forming an unfired multilayer structure by stacking the dielectric green sheet, applying an external electrode paste including a co-material including Ba and Ti, on a side face of the unfired multilayer structure; and firing the unfired multilayer structure and the external electrode paste, wherein, when a first group of metal elements constituting the main component ceramic is compared with a second group of metal elements constituting the co-material, one of the first group and the second group contains a metal element different from the metal element constituting the other.

DETAILED DESCRIPTION

For example, a slurry of dielectric ceramic powder dispersed in an organic binder is made into a constant thickness by a doctor blade or the like to create a dielectric green sheet. After forming an internal electrode pattern by screen-printing a conductive paste, in which a metal powder is dispersed in an organic vehicle, on the dielectric green sheet, stacking and hot press molding are performed to obtain a multilayer structure. Next, the binder is removed and the sintered multilayer chip is removed, and external electrodes are formed so as to take out the internal electrodes, thereby obtaining a ceramic electronic component (see, for example, Japanese Patent Application Publication No. H05-3134).

The external electrodes were formed by applying a metal paste containing glass frit to the multilayer chip by a dipping method or the like and baking the metal paste. However, when the dielectric green sheet is fired, the grain size of the ceramic varies and the adhesion of the external electrodes varies. In this case, adhesion becomes weaker. When there is a gap between the surface of the multilayer chip and the external electrode, the adhesion of the external electrode is weakened.

A description will be given of an embodiment with reference to the accompanying drawings.

Figure 1:
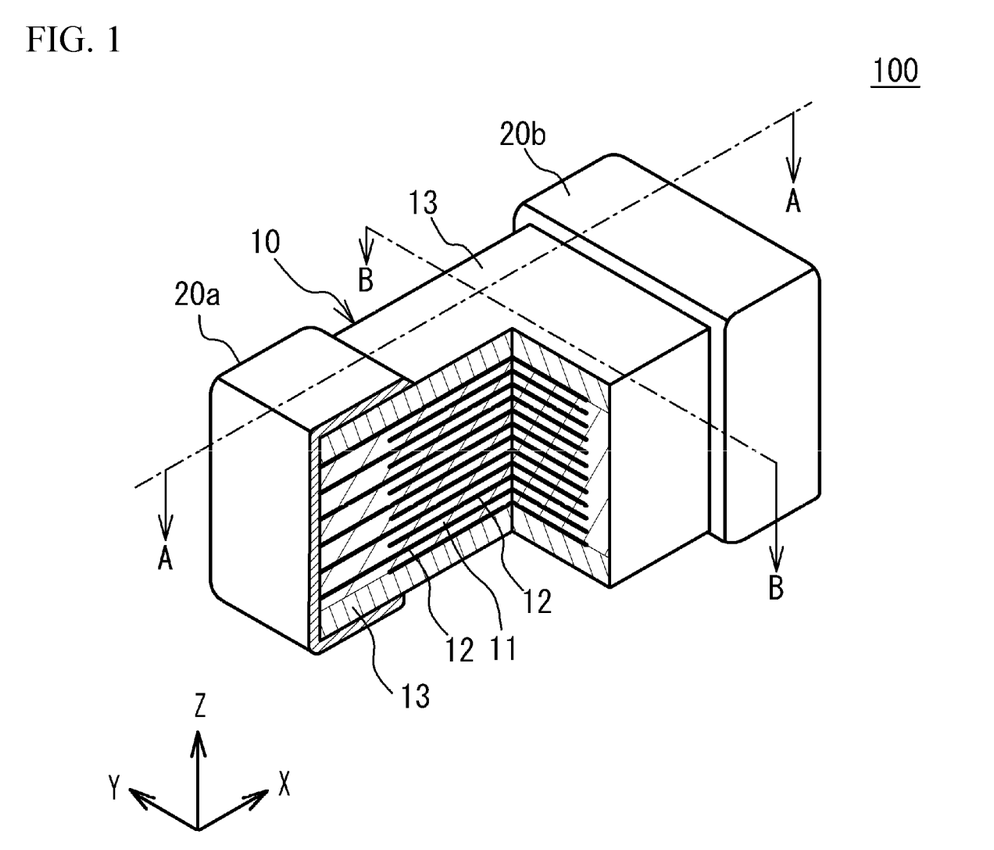
FIG. 1 illustrates a perspective view of a multilayer ceramic capacitor in which a cross section of a part of the multilayer ceramic capacitor is illustrated.
Figure 2:
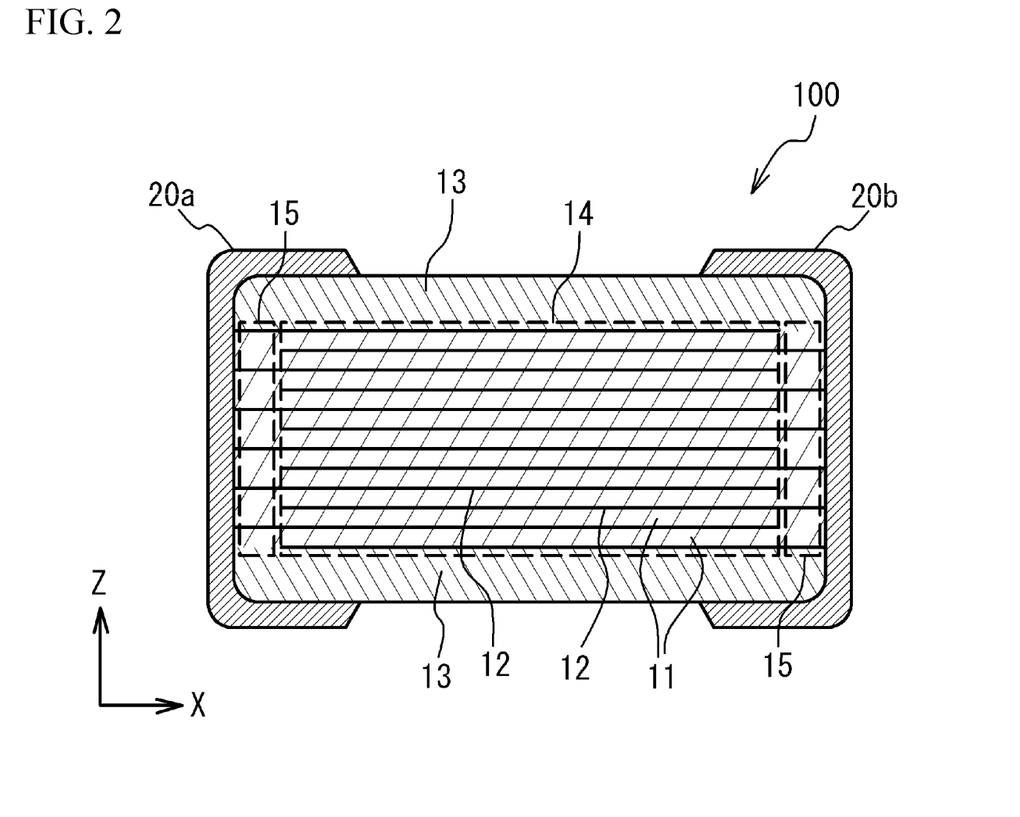
FIG. 2 illustrates a cross sectional view taken along a line A-A of FIG. 1.
Figure 3:
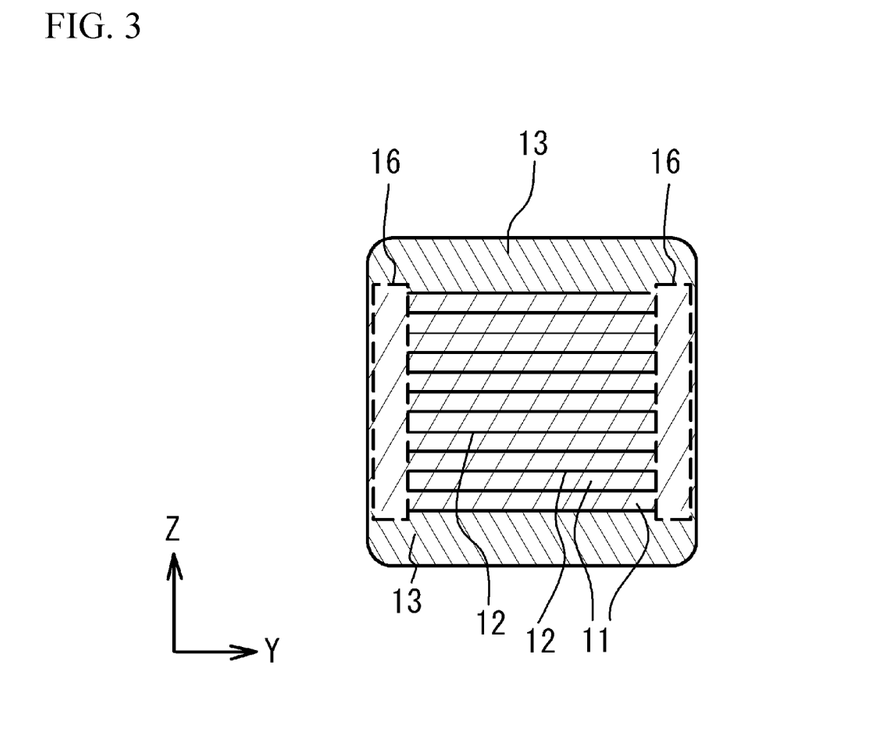
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The main component of the dielectric layer 11 is, for example, a ceramic material having a perovskite structure represented by the general formula $ABO_3$. The perovskite structure contains $ABO_{3-\alpha}$ outside the stoichiometric composition. In this embodiment, a ceramic material containing at least calcium (Ca) and zirconium (Zr) is used as the main component ceramic of the dielectric layer 11. For example, the main component ceramic of the dielectric layer 11 may contain strontium (Sr), titanium (Ti), or the like. The ceramic material can be represented, for example, by the $Ba_xSr_yCa_zZr_sTi_tO_3$ composition formula. In this composition formula, x satisfies $0 \leq x < 0.4$. y satisfies $0 \leq y < 0.7$. z satisfies $0 < z < 0.8$. x, y, and z satisfy $x+y+z=1$. s satisfies $0.9 < s \leq 1$. t satisfies $0 \leq t < 0.1$. For example, the main component ceramic of dielectric layer 11 functions as a paraelectric.

Additives may be added to the dielectric layer 11. As additives to the dielectric layer 11, magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co(cobalt), Ni (nickel), Li (lithium), B (boron), Na (sodium), K (potassium) or Si (silicon), or a glass including cobalt, nickel, lithium, boron, sodium, potassium or silicon.

The internal electrode layers 12 are mainly composed of base metals such as nickel, copper (Cu), and tin (Sn). As the internal electrode layer 12, noble metals such as platinum (Pt), palladium (Pd), silver (Ag), gold (Au), and alloys containing these noble metals may be used.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Figure 4A:
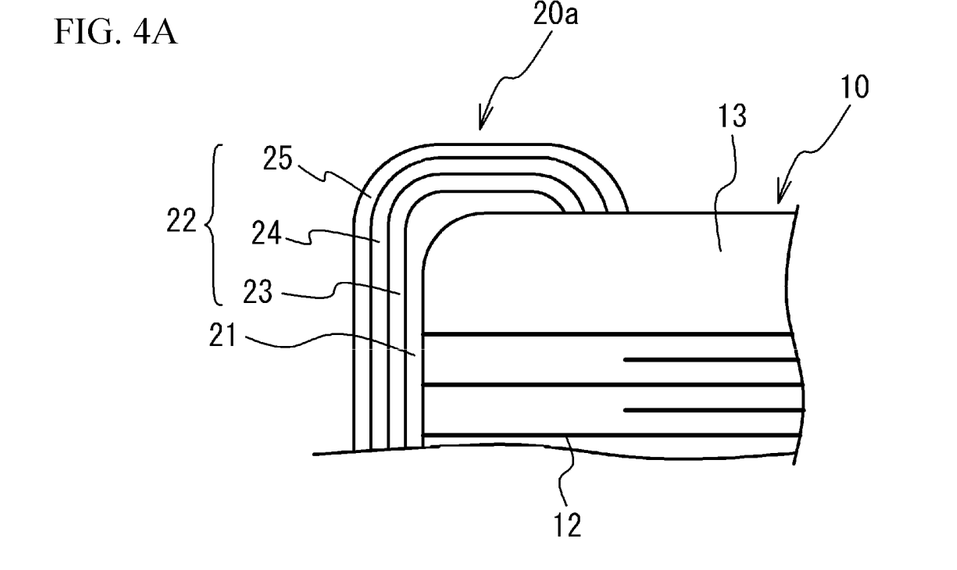
FIG. 4A illustrates an enlarged cross sectional view of a vicinity of an external electrode.

FIG. 4A is an enlarged cross-sectional view of the vicinity of the external electrode 20a. Hatches are omitted in FIG. 4A. As illustrated in FIG. 4A, the external electrode 20a has a structure in which a plated layer 22 is provided on a base layer 21.

Figure 4B:
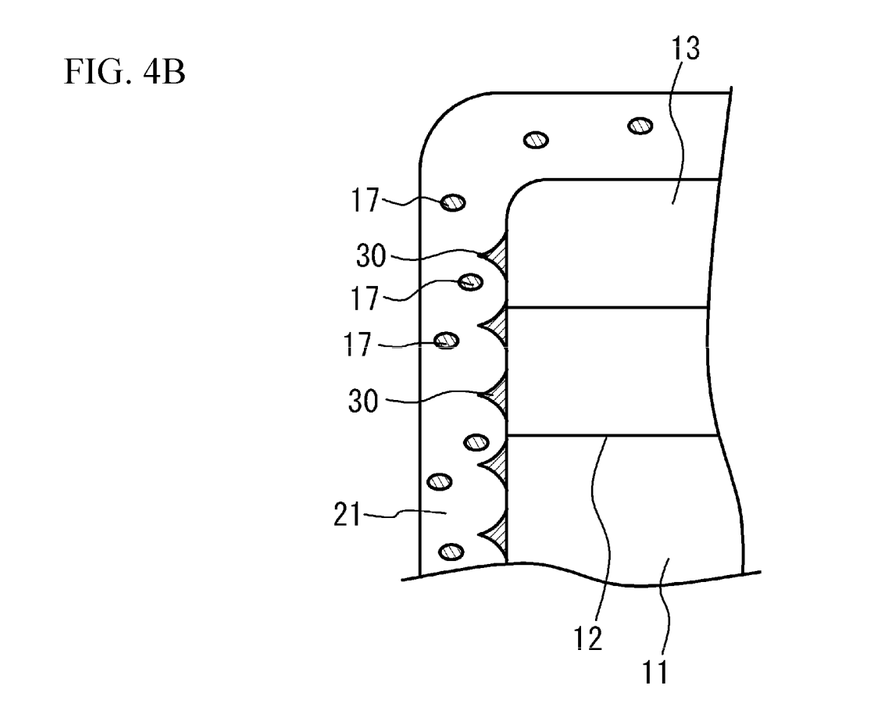
FIG. 4B illustrates an enlarged view of a vicinity of a base layer.

FIG. 4B is an enlarged view of the vicinity of the base layer 21. A main component of the base layer 21 is Ni, Cu, or the line. The base layer 21 has a structure in which a co-material 17 is dispersed. The co-material 17 is ceramic particles and contains Ba and Ti. When comparing the constituent metal element group of the main component ceramic of the dielectric layer 11 and the constituent metal element group of the co-material 17, one of them contains a metal element different from the constituent metal element of the other. For example, the metal element group of the main component ceramic of the dielectric layer 11 may contain a metal element that is not included in the metal element group of the co-material 17. Alternatively, a metal element that is not included in the constituent metal element group of the co-material 17 or the constituent metal element group of the main component ceramic of the dielectric layer 11 may be included in the metal element group of the main component ceramic of the dielectric layer 11. As an example, $BaTiO_3$ or the like is used as the co-material 17.

The thickness of the base layer 21 in the X-axis direction is, for example, 5 μm or more and 30 μm or less, 7 μm or more and 25 μm or less, or 10 μm or more and 20 μm or less. The content of the co-material 17 in the base layer 21 is, for example, 5 wt % or more and 50 wt % or less, 10 wt % or more and 35 wt % or less, or 10 wt % or more and 20 wt % or less. The average grain size of the co-material 17 in the base layer 21 is, for example, 0.5 μm or more and 8.0 m or less, 1.0 μm or more and 6.0 μm or less, or 2.0 μm or more and 5.0 μm or less. In addition, hatches other than the co-material 17 are omitted in FIG. 4B. Such thickness and grain size can be confirmed by enlarging, for example, the XZ cross section of the target component with SEM or TEM. The average grain size of the co-material can be obtained by measuring the long diameter and the short diameter of 30 grains and obtaining the average value.

The plated layer 22 is mainly composed of metals such as Cu, Ni, Al, Zn, and Sn, or alloys of two or more of these metals. The plated layer 22 may be a plated layer of a single metal component, or may be a plurality of plated layers of mutually different metal components. For example, the plated layer 22 has a structure in which a first plated layer 23, a second plated layer 24 and a third plated layer 25 are formed in order from the base layer 21 side. The first plated layer 23 is, for example, a Cu-plated layer. The second plated layer 24 is, for example, a Ni-plated layer. The third plated layer 25 is, for example, a Sn-plated layer.

Although FIG. 4A and FIG. 4B illustrate the external electrode 20a, the external electrode 20b also has the same stack structure.

Further, as exemplified in FIG. 4B, a projection portion 30 is formed between the base layer 21 and the multilayer chip 10 so as to protrude toward the base layer 21. A plurality of projection portions 30 may be formed. For example, the plurality of projection portions 30 may be provided at predetermined intervals. The projection portion 30 has, for example, a wedge shape that protrudes toward the base layer 21. For example, the projection portion 30 has a shape that gradually tapers toward the base layer 21. The projection portion 30 may cover a part of the exposed portion of the internal electrode layer 12 formed up to one end of the end face of the multilayer chip 10, but does not cover all of the exposed portion. Therefore, electrical connection between the internal electrode layers 12 and the external electrodes 20a and 20b is ensured.

A main component of the projection portion 30 is at least Ba, Ca, and Ti. The main component of the projection portion 30 may have a perovskite structure. For example, the main component of the projection portion 30 is $BaCaTiO_3$. The projection portion 30 may contain a component contained in the dielectric layer 11. For example, the projection portion 30 may contain Sr, Si, Mn, or the like.

The projection portion 30 has a projection shape with respect to the base layer 21. Therefore, the contact area of the base layer 21 when contacting the multilayer chip 10 and the projection portion 30 is increased, compared with the case where the base layer 21 is in contact only with the flat surface of the multilayer chip 10. As a result, an anchor effect is obtained, and adhesion of the base layer 21 is enhanced. Since the projection portion 30 is mainly composed of ceramic, high adhesion is obtained between the projection portion 30 and the dielectric layer 11 exposed at the end face of the multilayer chip 10. As described above, the external electrodes 20a and 20b have high adhesion to the multilayer chip 10.

For example, the projection portion 30 has a width of 0.5 μm or more and 5.0 μm or less, or a width of 1.0 μm or more and 4.0 μm or less, or a width of 1.5 μm or more and 3.5 m or less, in the Z-axis direction. For example, the projection portion 30 has a height of 0.5 μm or more and 7.0 μm or less toward the base layer 21 in the X-axis direction, or a height of 1.5 μm or more and 5.0 μm or less, or a height of 2.0 μm or more and 4.0 μm or less. The size of the projection portion 30 can be confirmed by enlarging, for example, the XZ cross section of the target component with SEM or TEM.

Figure 5:
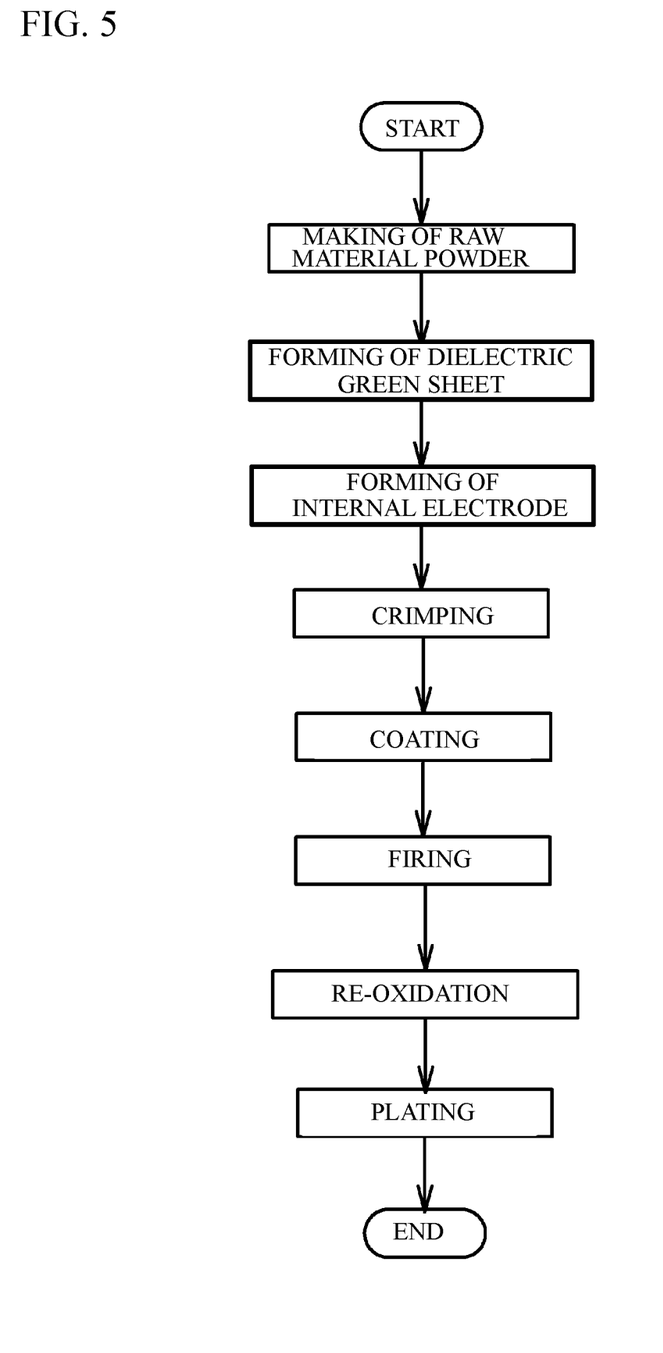
FIG. 5 illustrates a manufacturing method of a multilayer ceramic capacitor.

Next, a description will be given of a manufacturing method of the multilayer ceramic capacitors 100. FIG. 5 illustrates a manufacturing method of the multilayer ceramic capacitor 100.

(Making process of raw material powder) A dielectric material for forming the dielectric layer 11 is prepared. The powder of the main component ceramic of the dielectric layer 11 can be obtained by synthesizing materials for the dielectric layer 11. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co(cobalt), Ni (nickel), Li (lithium), B (boron), Na (sodium), K (potassium) or Si (silicon), or a glass including cobalt, nickel, lithium, boron, sodium, potassium or silicon. Among the additive compounds, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained.

(Forming process of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is formed on a base material 51 by, for example, a die coater method or a doctor blade method, and then dried. The base material 51 is, for example, PET (polyethylene terephthalate) film. The forming process is not illustrated.

Figure 6A:
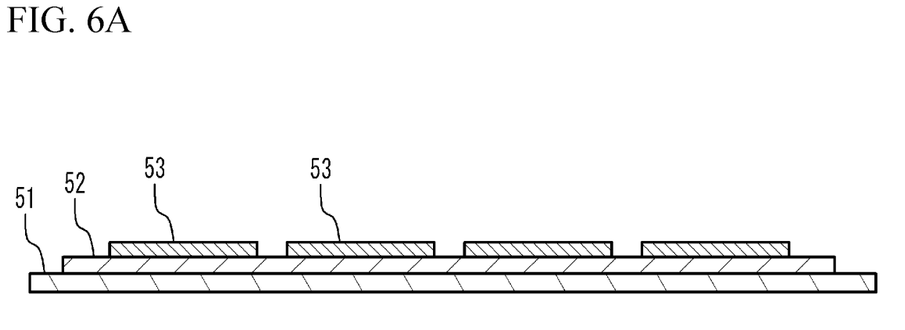
FIG. 6A and FIG. 6B illustrate a stacking process.

(Forming process of internal electrode layer) Next, as illustrated in FIG. 6A, an internal electrode pattern 53 is formed on the dielectric green sheet 52. In FIG. 6A, as an example, four parts of the internal electrode pattern 53 are formed on the dielectric green sheet 52 and are spaced from each other. The dielectric green sheet 52 on which the internal electrode pattern 53 is formed is a stack unit.

A metal paste of the main component metal of the internal electrode layer 12 is used as the internal electrode pattern 53. The method of forming the internal electrode pattern 53 may be printing, sputtering, vapor deposition or the like.

Figure 6B:
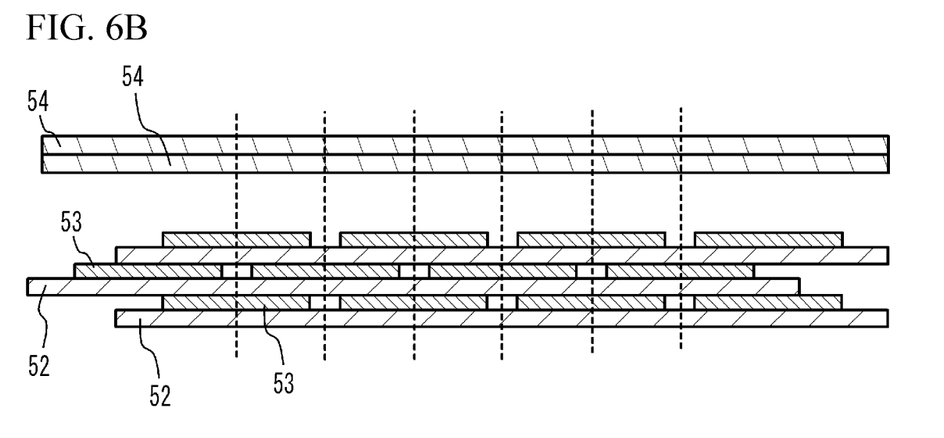

(Crimping process) Next, the dielectric green sheets 52 are peeled from the base materials 51. As illustrated in FIG. 6B, the stack units are stacked. Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm x0.5 mm). In FIG. 6B, the multilayer structure is cut along a dotted line. The components of the cover sheet 54 may be the same as those of the dielectric green sheet 52. Alternatively, the additive in the cover sheet 52 may be different from that in the dielectric green sheet 52.

(Coating process) The ceramic multilayer structure thus obtained is subjected to a binder removal treatment in an $N_2$ atmosphere. And then, an external electrode paste, which will be the base layer 21, is applied on the ceramic multilayer structure by a dipping method or the like. The external electrode paste contains the powder of the main component metal of the base layer 21, and the co-material 17. For example, the external electrode paste is applied to the two end faces of the ceramic multilayer structure where the internal electrode patterns 53 are exposed. The external electrode paste may extend to the top face, bottom face, and two side faces of the ceramic multilayer structure.

(Firing process) The resulting ceramic multilayer structure is fired for 15 minutes to 4 hours in a reductive atmosphere having an oxygen partial pressure of $10^{-5}$ to $10^{-8}$ atm in a temperature range of 1100 degrees C. to 1300 degrees C. Thus, the multilayer chip 10 and the base layer 21 are fired together with each other.

Figure 7A:
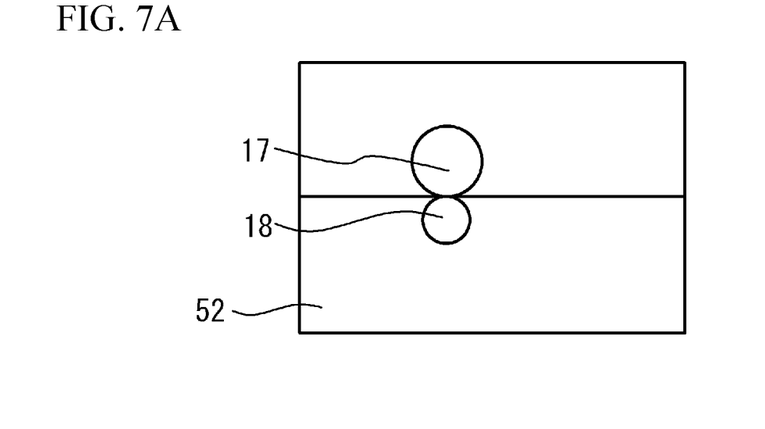
FIG. 7A to FIG. 7C illustrate a mechanism of diffusion.
Figure 7B:
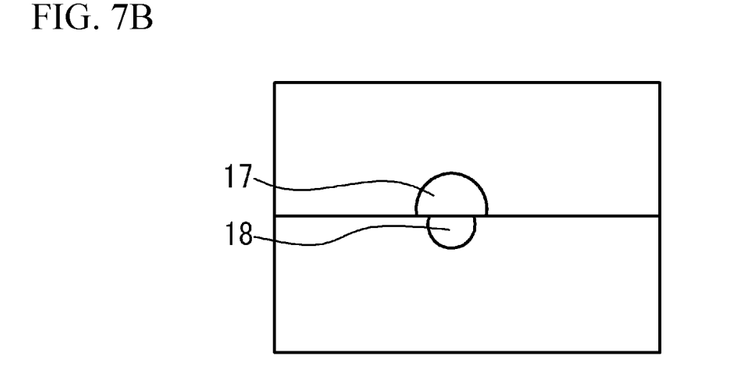
Figure 7C:
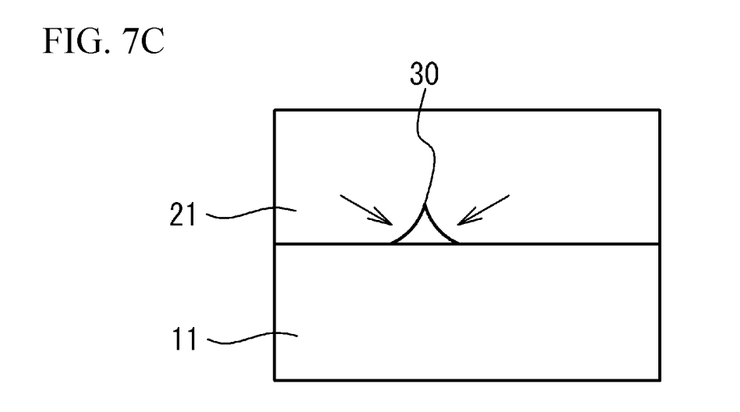

When the group of metal elements constituting the main component ceramic of the dielectric green sheet 52 and the group of metal elements constituting the co-material 17 are compared, one of them contains a metal element different from that of the other. Therefore, diffusion occurs when the multilayer chip 10 and the base layer 21 are simultaneously fired. The diffusion mechanism is presumed as follows. For example, as illustrated in FIG. 7A, the co-material 17 contacts a main component ceramic powder 18 of the dielectric green sheet 52. For example, Ba of the co-material 17 contacts Ca of the main component ceramic powder 18. Next, as illustrated in FIG. 7B, Ba and Ca diffuse to each other while changing to surface contact. Next, as illustrated in FIG. 7C, while Ba and Ca are mutually diffusing, stress is applied due to shrinkage during firing, causing shrinkage. It is presumed that the projection portion 30 is formed through the above process. The firing conditions are adjusted by performing a trial production so that the process of forming the projection portion 30 progresses sufficiently. For example, when the cooling rate from the maximum temperature is set to less than 10° C./min and a sufficient cooling time is taken, the projection shape itself is likely to be formed. Further, when the difference in the main component composition between the co-material 17 and the main component ceramic powder 18 is increased, the diffusion progresses and the projection portion 30 are easily formed in a short time of firing. In addition, if the particle diameters of the co-material 17 and the main component ceramic powder 18 are made small, the projection portions 30 can be easily formed in a short time as the above process proceeds.

(Re-oxidizing process) After that, a re-oxidation process may be performed in $N_2$ gas atmosphere at 600 degrees C. to 1000 degrees C.

(Plating process) After that, by a plating process, the plated layer 22 is formed on the base layer 21. For example, plated layers of Cu, Ni, Sn or the like may be formed on the base layer 21. With the process, the first plated layer 23, the second plated layer 24 and the third plated layer 25 are formed.

According to the manufacturing method according to the present embodiment, the projection portion 30 that protrudes toward the base layer 21 is formed between the base layer 21 and the multilayer chip 10. In this case, the contact area of the base layer 21 with the multilayer chip 10 and the projection portion 30 is larger than when the base layer 21 contacts only the flat surface of the multilayer chip 10. As a result, an anchor effect is obtained, and adhesion of the base layer 21 is enhanced. Since the projection portion 30 is mainly composed of ceramic, high adhesion can be obtained between the projection portion 30 and the dielectric layer 11 exposed on the end surface of the multilayer chip 10. As described above, the external electrodes 20a and 20b have high adhesion to the multilayer chip 10.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example) $Ba_xSr_yCa_zZr_sTi_tO_3$ was used as the main component ceramic powder of the dielectric green sheet. Note that x=0.17, y=0.56, z=0.27, s=0.95, and t=0.05. That is, the amount of Ba was 8.5 mol %, the amount of Sr was 28.0 mol %, the amount of Ca was 13.5 mol %, the amount of Zr was 47.5 mol %, and the amount of Ti was 2.5 mol %. In addition, when the amount of $Ba_xSr_yCa_zZr_sTi_tO_3$ was assumed to be 100 mol %, Mn and Si were added as oxides such that the amount of Mn was 0.42 mol % and the amount of Si was 0.47 mol %. After the mixed powder was dispersed in an organic solvent to form a slurry, a binder was added. The slurry was applied on a PET film in a predetermined thickness, and dried to obtain a dielectric green sheet.

On the dielectric green sheets, an internal electrode pattern was formed by printing a paste containing Ni as a main component and 12 parts by weight of the main component ceramic of the dielectric green sheets. A plurality of stack units thus obtained were stacked, and the upper and lower dielectric green sheets (cover sheets) on which the internal electrode pattern was not printed were sandwiched and crimped. Thereafter, heat treatment (binder removal treatment) was performed in an $N_2$ atmosphere.

An external electrode paste containing Ni paste and 10 parts by weight of $BaTiO_3$ powder with an average particle size of 0.1 μm as co-materials was formed by dipping on the two end faces where the internal electrode layers were exposed. In the metal component and common material component, the amount of Ni was 78 mol %, the amount of Ba was 11 mol %, and the amount of Ti was 11 mol %. Further, when the metal component and the co-material component were assumed to be 100 mol %, Ho, Mn, and Si are oxidized so that the amount of Ho was 0.09 mol %, the amount of Mn was 0.01 mol %, and the amount of Si was 0.07 mol %.

After that, the stacked stack units was fired at a maximum temperature of 1310° C. for 6 to 7 minutes in a reducing atmosphere containing about 1.0% by volume of $H_2$. Electrolytic plated layers were formed on the base layer in the order of Cu, Ni, and Sn. The obtained multilayer ceramic capacitor had a size of 1.0 mm in length, 0.5 mm in width and 0.5 mm in height.

(Comparative example) In Comparative example, as the external electrode paste, an external electrode paste containing Ni paste and 10 parts by weight of $(Ba,Sr,Ca)(Zr,Ti)O_3$ powder having an average particle size of 0.35 μm as common materials was formed with a dipping. In the metal component and the co-material component, the amount of Ni was 79.83 mol %, the amount of Ca was 6.03 mol %, the amount of Sr was 3.47 mol %, the amount of Ba was 0.47 mol %, the amount of Ti was 3.50 mol %, and the amount of Zr was 6.49 mol %. Further, when the amount of the metal component and the co-material component ware assumed to be 100 mol %, Ho, Mn, and Si ware added as oxide so that the amount of Ho was 0.01 mol %, the amount of Mn was 0.09 mol %, and the amount of Si was 0.10 mol %. Other conditions were the same as in Example.

For each of Example and Comparative example, the cross section on the XZ plane was exposed, and the presence or absence of a projection portion between the base layer and the multilayer chip was observed by SEM-EDS. No projection portion was observed in Comparative example. It is thought that this was because the $(Ba,Sr,Ca)(Zr,Ti)O_3$ powder was used as the co-material for the external electrode paste, and therefore diffusion from the dielectric layer did not occur. In contrast, in Example, projection portions containing Ca, Ba, Ti, and Sr were observed. This was probably because Ca and Sr diffused from the dielectric layer because $BaTiO_3$ powder was used as the co-material for the external electrode paste. In addition, almost no Zr diffused into the projection portions, and the diffusion amount of Ca and Sr in the projection portions were each greater than the diffusion amount of Zr. Such a composition of the projection portion can increase the density of the projection portion from that of the multilayer chip, so that the adhesion to the external electrode can be further enhanced. In addition, as illustrated in FIG. 4B, many of the projection portions of Example have a substantially triangular shape with the bottom line being the interface between the base layer of the external electrode and the multilayer chip, and the vertex being within the region of the base layer. The apex was located at a distance from the bottom line in the thickness direction within a range of 8 to 43% of the thickness of the base layer at each position. Furthermore, many of the sides extending from the apex of the substantially triangular shape to the bottom line were curved so as to protrude into the region of the projection portion. Such a curved shape increases the contact area between the projection portion and the base layer, so that the adhesion between the multilayer chip and the external electrode can be further enhanced. Thus, it can be seen that in Example, the projection portion was formed and the adhesion of the external electrodes was improved.

TABLE 1

| MAIN COMPONENT CERAMIC | | | | | ADDITIVE | |
|---|---|---|---|---|---|---|
| Ca | Sr | Ba | Ti | Zr | Mn | Si |
| 13.5 | 28.0 | 8.5 | 2.5 | 47.5 | 0.42 | 0.47 |

(mol %)

TABLE 2

| | CO-MATERIAL | | | | | ADDITIVE | | | | | | METAL |
|---|---|---|---|---|---|---|---|---|---|---|---|---|
| | Ca | Sr | Ba | Ti | Zr | Ho | Mg | Mn | V | Cr | Si | Ca | Ni |
| EXAMPLE | — | — | 11 | 11 | — | 0.09 | — | 0.01 | — | — | 0.07 | — | 78 |
| COMPARATIVE EXAMPLE | 6.03 | 3.47 | 0.47 | 3.50 | 6.49 | 0.01 | — | 0.09 | — | — | 0.10 | — | 79.83 |

(mol %)

Although the embodiments of the present invention have been described in detail, it is to be understood that the various change, substitutions, and alterations could be made hereto without departing from the spirit and scope of the invention.

The invention claimed is:

1. A ceramic electronic device comprising:
   a multilayer chip having a plurality of dielectric layers and a plurality of internal electrode layers so as to face each other, each of the plurality of internal electrode layers being stacked via each of the plurality of dielectric layers;
   an external electrode that is provided on an end face of the multilayer chip, contacts each end of at least a part of the plurality of internal electrode layers, and includes a co-material, the end face being an end of the multilayer chip in a direction in which the plurality of internal electrode layers extend; and
   a projection portion that is provided between the external electrode and the multilayer chip and has a projection shape toward the external electrode from the multilayer chip in a cross section including a stacking direction of the plurality of dielectric layers,
   wherein a main component of the projection portion is ceramic including at least Ba, Ca and Ti.

2. The ceramic electronic device as claimed in claim 1,
   wherein a main component of the plurality of dielectric layers includes Ca and Zr,
   wherein the co-material is a ceramic grain and includes Ba and Ti,
   wherein a main component of the plurality of dielectric layers is different from a main component of the co-material.

3. The ceramic electronic device as claimed in claim 1, wherein the external electrode has a structure in which a plated layer is formed on a base layer.

4. The ceramic electronic device as claimed in claim 1, wherein a main component of the base layer is Ni.

5. The ceramic electronic device as claimed in claim 1, wherein the main component ceramic of the plurality of dielectric layers is expressed by $Ba_xSr_yCa_zZr_sTi_tO_3$ composition formula in which x satisfies $0 \leq x < 0.4$, y satisfies $0 \leq y < 0.7$, z satisfies $0 < z < 0.8$, x, y, z satisfy $x+y+z=1$, s satisfies $0.9 < s \leq 1$, and t satisfies $0 \leq t < 0.1$.

6. The ceramic electronic device as claimed in claim 1, wherein the projection portion includes Sr.

7. The ceramic electronic device as claimed in claim 1, wherein the plurality of dielectric layers act as paraelectric.

8. The ceramic electronic device as claimed in claim 1, wherein the projection portion has a width of 0.5 µm or more and 5.0 µm or less in a stacking direction of the plurality of dielectric layers and a height of 0.5 µm or more and 7.0 µm or less toward the external electrode.

9. The ceramic electronic device as claimed in claim 1, wherein a main component of the co-material is $BaTiO_3$.

10. The ceramic electronic device as claimed in claim 1, wherein the projection portion has a substantially triangle shape having a bottom line of an interface between a base layer of the external electrode and has an apex in the base layer.

11. The ceramic electronic device as claimed in claim 10, wherein the apex was located at a distance from the bottom line in a thickness direction within a range of 8 to 43% of a thickness of the base layer at each position.

12. The ceramic electronic device as claimed in claim 10, wherein in the triangle shape, a side extending to the bottom line from the apex is curved so as to protrude toward a region of the projection portion.

13. The ceramic electronic device as claimed in claim 1, wherein a size of the ceramic electronic device is equal to or less than a size in which a length is 1.0 mm, a width is 0.5 mm and a height is 0.5 mm.

14. The ceramic electronic device as claimed in claim 1, wherein a size of the ceramic electronic device is larger than a size in which a length is 1.0 mm, a width is 0.5 mm and a height is 0.5 mm.

15. The ceramic electronic device as claimed in claim 1, wherein the projection portion is segregated on a boundary between the external electrode and the multilayer chip.

16. The ceramic electronic device as claimed in claim 15, wherein, among a boundary between the external electrode and the dielectric layers and a boundary between the external electrode and the internal electrode layers, the projection portion is segregated only on the boundary between the external electrode and the dielectric layers.

* * * * *